(12) United States Patent
Gärtner et al.

(10) Patent No.: US 6,741,199 B2
(45) Date of Patent: May 25, 2004

(54) ARRANGEMENT AND PROCESS FOR INTERPOLATING A MEASURED SIGNAL

(75) Inventors: Peter Gärtner, Budapest (HU); Harald Richter, Gärtringen (HU); Anton Rodi, Leimen (DE)

(73) Assignee: Anton Rodi, Leimen (DE)

( * ) Notice: Subject to any disclaimer, the term of this patent is extended or adjusted under 35 U.S.C. 154(b) by 0 days.

(21) Appl. No.: 10/314,178

(22) Filed: Dec. 6, 2002

(65) Prior Publication Data
US 2003/0107510 A1 Jun. 12, 2003

(30) Foreign Application Priority Data
Dec. 6, 2001 (DE) .......................... 101 60 835

(51) Int. Cl.[7] ............................... H03M 1/12
(52) U.S. Cl. ..................... 341/158; 341/111
(58) Field of Search ............... 341/111, 156, 341/158, 159

(56) References Cited

U.S. PATENT DOCUMENTS

| | | | |
|---|---|---|---|
| 3,234,361 A | | 2/1966 | McLaren et al. |
| 4,631,520 A | * | 12/1986 | Wingate ................. 340/347 P |
| 4,841,225 A | | 6/1989 | Meyer |
| 5,067,089 A | * | 11/1991 | Ishii et al. ................ 341/111 |
| 5,684,485 A | | 11/1997 | Paillardet et al. |
| 5,867,116 A | * | 2/1999 | Nakamura et al. .......... 341/159 |
| 6,121,912 A | | 9/2000 | Brandt |
| 2002/0135384 A1 | | 9/2002 | Strack et al. |

FOREIGN PATENT DOCUMENTS

| | | |
|---|---|---|
| DE | 39 18 732 A1 | 1/1990 |
| DE | 695 10 413 T2 | 1/1996 |
| DE | 199 46 750 A1 | 4/2000 |
| DE | 100 35 192 C1 | 10/2001 |
| DE | 100 59 880 A1 | 6/2002 |
| EP | 0 199 826 A1 | 11/1986 |
| EP | 0 220 547 A1 | 5/1987 |
| EP | 1 102 039 A1 | 5/2001 |
| JP | 62 075 307 A | 4/1987 |

* cited by examiner

Primary Examiner—Howard L. Williams
(74) Attorney, Agent, or Firm—Laurence A. Greenber; Werner H. Stemer; Manfred Beck

(57) ABSTRACT

An arrangement for interpolating signals interpolates an analog measured signal which is dependant on a measured variable and which is fed to a voltage divider whose pickoff signals are fed to comparators from whose output signals the interpolated measured variable is determined. In order to reduce cost, the pickoff signals are fed by switches to comparators whose number is smaller than that of the pickoff signals. In this process the switches must connect the pickoff signals to the comparators consistently.

26 Claims, 7 Drawing Sheets

Parameter:

| | |
|---|---|
| Lim | Basic Filter Parameter |
| Unsym | Asymmetry in/against Direction of Movement |
| MAX | Automatic Resetting After MAX Cycles |

ARRANGEMENT AND PROCESS FOR INTERPOLATING A MEASURED SIGNAL

BACKGROUND OF THE INVENTION

FIELD OF THE INVENTION

The present invention relates to an arrangement and process for interpolating a measured signal.

Sensor systems with incremental and absolute measurement and increasingly, for example for angular position and position measurements, the combination of both measurement techniques in high resolution absolute measuring systems are used for industrial purposes. There is a continual requirement for recording absolute position and relative displacement in measuring systems but it is often limited to purely relative measurements since for example the incremental sensor systems suited to this purpose are more cost-effective to produce.

We explain below the basic requirements for high resolution measured signals based on the digitalization of angular position and position measuring systems, whereby our observations may equally be attributed and applied to other physically/chemically derived measured values.

In order to use an incremental measuring system to record absolute position as well, other auxiliary units are required, which determine on the one hand the absolute starting position and permanently calculate on the other hand the incremental signals relative to it sequentially and directionally. Besides the ON/OFF effect of the supply voltage, interference to the mains or faults in transfer of the incremental signals also cause a loss of the absolute signal value in the need to establish a new reference each time. For machines in continuous operation in environments which are prone to interference in particular these measuring systems are unreliable and problematic in an otherwise uninterrupted production process.

The conventional absolute measuring system is again very costly in the implementation of its sensor system and reaches its limits, particularly where high resolutions of the angular and linear distances traveled also in the high speed range are required.

Combined measuring systems have therefore increasingly become established and have absolute angular position/position measuring sensors with resolutions of for example $\geq 8$ bits, i.e. angular distances which are smaller than $1.5°$ and linear distances of $\leq 50$ $\mu$m.

Useful measured signals totally converted to absolute values in the angular position/position measuring sensor—as described in more detail in the application for Swiss patent CH210599—require in particular a careful method of recording and evaluating the measured signals. Between the absolute values which are determined separately in these systems there are incremental values lying between two absolute values which are used to create the total absolute value. The analog-digital converters with comparator technologies used for interpolating the incremental values have the disadvantage that the cost for resolutions of even 5 to 6 bits are too high and the required hardware integration approaches its limits.

For every step increase in resolution, the cost of hardware integration increases by a factor of 2. This technology is shown in FIG. 1 of the drawing. The measured signal $U_1$ can change e.g. linearly from 0 up to $U_{1max}$. $U_1$ is applied to a voltage divider Sp, whose pickoffs are all coupled individually to an operational amplifier COMP, to which the reference voltage $U_2$ is also fed. Each of the operational amplifiers COMP switch, whenever the pickup voltage fed to them has reached the preset threshold. The switching of the operational amplifiers determines each particular intermediate value reached, which is then added to the neighboring absolute value.

The above mentioned patent specification CH210599 points to the expected increase in processing speed of semiconductor technology as a practicable solution to overcoming the high cost of higher resolutions and suggests carrying out until that time additional sine/cosine signals and undertaking higher resolution AD conversion externally.

SUMMARY OF THE INVENTION

The object of the present invention is to create an interpolation circuitry as well as a process for interpolating analog measured variables which operates with higher speed and accuracy and overcomes the above mentioned disadvantages.

This object is achieved by an arrangement for interpolating an analog measured signal which is dependant on the measured variable, and which is fed to a voltage divider (Sp) whose pickoff signals are fed to comparators, from whose output signals the interpolated measured variable is determined, wherein the pickoff signals are fed by means of switches ($S_1$ to $S_8$) to comparators (Comp, Comp$_{-1}$) whose number is smaller than that of the pickoff signals and the switches ($S_1$ to $S_8$) connect the pickoff signals consistently to comparators (Comp, Comp$_{-1}$).

It is generally understood that by comparator is meant a suitable threshold switch which operates sufficiently fast and with sufficiently high resolution.

The interpolator or interpolation according to the invention makes particular use of the continuity of functions for measured signal processing used for determining measured variables, e.g. with trigonometric functions for SIN and COS signals. Below we explain the beneficial design of the interpolator or interpolation method using the example of SIN/COS signal processing of position-dependent variables, whereby the arrangement as well as its implementation is basically suitable for and is of benefit for use in other analog and especially continuous analog measured signal flows.

A sensor system must record measured values as continuously as possible if it is to be used also in dynamic applications. This ensures the fastest possible access to measured values at any time since they are already processed when they are called up and may be outputted in "real time". Special measures must be taken with such "real time" measuring systems whose clock-pulse rate for logical signal processing is also used for interpolating analog values. Apart from the increasing cost of for example hardware logic to interpolate higher resolutions, it is particularly important to take into account the ever smaller signal amplitudes for each step in resolution critical for accuracy and sensitivity of the recording process in addition to time-critical switching procedures.

The object of the invention is also achieved by a method for interpolating an analog measured signal which is dependant on the measured variable, and which is fed to a voltage divider (Sp) whose pickoff signals are fed to comparators, from whose output signals the interpolated measured variable is determined, wherein the pickoff signals are fed by means of switches ($S_1$ to $S_8$) to comparators (Comp, Comp$_{-1}$) whose number is smaller than that of the pickoff signals and the switches ($S_1$ to $S_8$) connect the pickoff signals consistently to comparators (Comp, Comp$_{-1}$).

The method of interpolation described in the invention solves the above-mentioned object by selecting a smaller number of comparators to use for comparison than the number of reference points given by the resolution and by using switches to feed these consistently to at least one comparator for signal evaluation.

This beneficial method of interpolation has limits in the resolution of the analog values given by the accuracy of the resistor dividers to be formed and the offset values of the comparators. Since the resistance values are in the thousandths range of the accuracies which can be achieved by semiconductors and the offset values of the comparators are also in the thousandths range of the useful signal, resolutions of approx. 8-bit can still be achieved at the first stage of interpolation without a great deal of extra expenditure. The advantage of the reduced number of comparators can find an additional use, however, in that an on chip offset adjustment is carried out which then allows the range of resolution to be expanded up to 10-bit with correspondingly more expensive resistors—e.g. parallel switching of the resistors allows a corresponding increase in accuracy.

In many applications, e.g. servo drives for position control, there is a requirement for the highest possible total resolutions, which are in the range of 22 . . . 24 and even up to 26 bits in rotary encoders. The same is true of stiff position controls of linear drives with distance resolutions of a few nanometers. In this case, it depends above all on the precision recording of the relative movement of the adjustment device to be measured, in order to derive the speed or acceleration for control from the value of the measured angle or position. Thus for angular position and position encoders the highest possible accuracies up to total-basic resolutions of e.g. 17 to 18 bits can be produced and beyond that only relatively evaluatable angular position/position resolutions of up to 22 to 26 bits.

In patent specification CH210599 for example the total absolute value of 17 to 18 bits is made up of a 12-bit basic absolute value and a 5 to 6-bit incremental value (also called the fine value) gained by means of interpolation. Here, even an interpolation of 8 bits would result in a total absolute value of 20 bits. And using the appropriate resistor dividers as well as offset compensation measures the total resolution can even be increased up to 22 bits.

In a further embodiment of the invention the resolution of the interpolation can be increased still further, up to 12 bit and beyond so that total absolute values of 24 to 26 bits can be achieved. This is accomplished by imposing a second interpolation stage on top of the first interpolation stage in which the individual difference values of the calculated first stage are amplified and further interpolated in the second stage. The measured values gained from the first interpolation stage are described as fine values and those from the second interpolation stage as finest values. The total absolute value of e.g. 24 bits being formed in this way comprises the basic absolute value of e.g. 12 bits and the interpolated value of e.g. 12 bits which is again formed from a for example 8-bit fine value and 4-bit finest value.

|  |  |
|---|---|
| Basic absolute value | 12 bits |
| + Fine value interpolation | + 8 bits |
| + Finest value interpolation | + 4 bits |
| = Total absolute value | = 24 bits |

The interpolation built up according to the invention allows the recording of a total absolute value to be determined under real time conditions. The total absolute value may be formed outside a sensor by for example feeding the basic absolute value and the SIN/COS signals to the evaluation electronics with the inventive interpolation and combining them here synchronously. It is particularly advantageous to create the interpolation in the sensor itself since this allows highest accuracy and resolution in creating the total absolute value in interference sensitive ambient conditions with maximum processing speeds. The very high resolutions also require appropriate treatment of the calculated interpolation values.

According to a further embodiment of the invention an adaptive interpolation filter is proposed in which the difference between the filtered measured value and the current measured value is fed in to a clocked evaluation unit. The differences are added together so that, when certain limit values are reached, the last filtered measured value is subsequently increased or reduced consistently by one resolution step and brought to the measured value output.

In a further embodiment of the invention a digital filter is formed so that the last determined direction of movement of the supplied measured values is used for various evaluation of the current measured values by at least one resolution step in the direction of the deviation from the measured value output. It is beneficial to continue the evaluation according to the deviation of the current measured values in comparison to the values used for the measured value output as well as by time according to inquiry clock-pulse cycles. Adaptive digital filtering has an advantage here in that the deviations to be determined relate solely to measured value deviations themselves and may therefore be used in the total measuring range without the influence of filter times—from standstill up to the maximum speed of the changes in measured values. Diverse evaluation by filter values according to direction of movement is determined by the bearing (play), elasticity as well as frictional conditions present predominantly in the mechanics. As a rule, therefore, the interference values are in total lower in the direction of movement so that filter measures are weaker than in the opposite direction and therefore can be carried out beneficially in many cases asymmetrically. But there are also other interference values such as e.g. control characteristics of the control unit or asymmetric signal interference values which can be optimally adjusted by the filter properties according to the direction of movement and possibly be carried out with opposite evaluation if required and under special circumstances. Optimizing asymmetric filtering of measured signals offers the benefit of achieving the fastest possible and interference free measured signal processing in application.

It is often the case in industrial applications however, especially at low speeds or standstill, that high measured signal resolutions are required, so that interpolation and also filtering can be chosen or automatically switched to suit the speed of the adjustment device to be measured. This allows interpolation to be chosen for example at standstill at the highest resolution or at the highest possible resolution proportional to a particular speed, so that the measured value can still be recorded in the resolution step under real time conditions—i.e. during one clock pulse cycle of measured value processing e.g. at 30 to 50 MHz. By including the speed of the measurement device it is possible to achieve e.g. the greatest interpolation step including the filtering optimized to it during measured signal processing.

Other features which are considered as characteristic for the invention are set forth in the appended claims.

Although the invention is illustrated and described herein as embodied in an arrangement and process for interpolating a measured signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
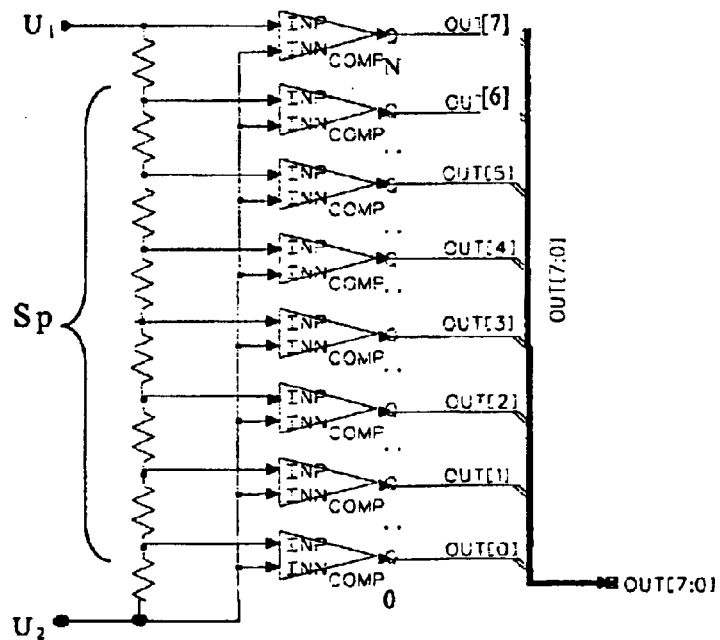
FIG. 1 shows the principle of traditional interpolation using a number of comparators.
Figure 2:
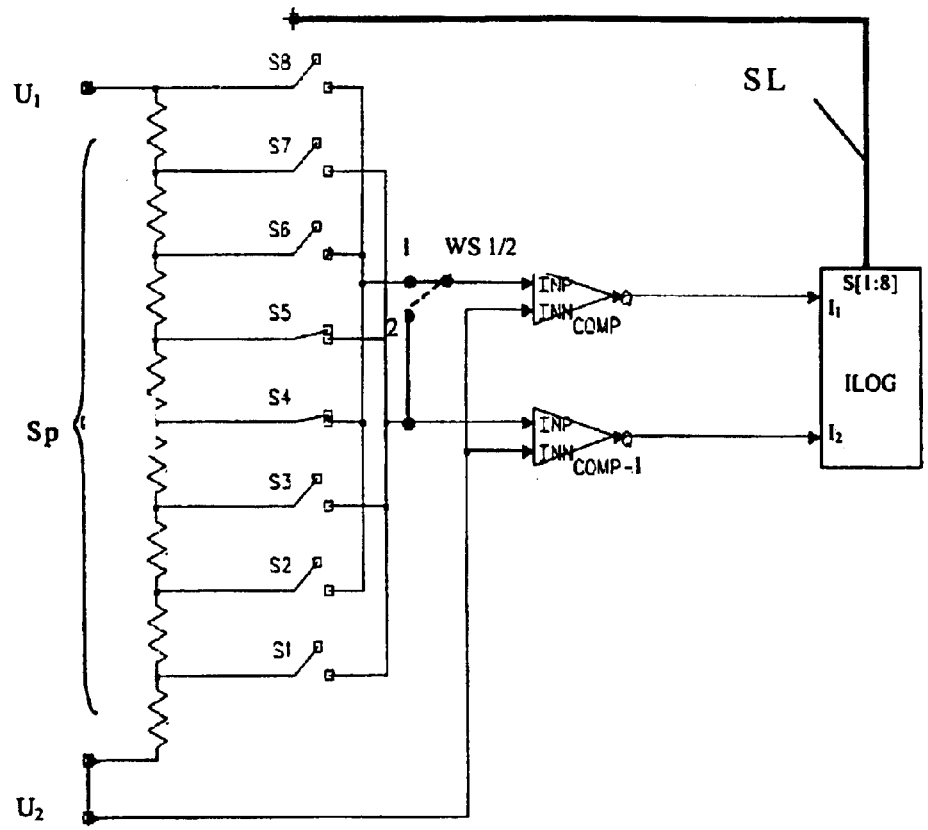
FIG. 2 shows the principle of the inventive interpolation using a network of switches and one or two comparators.

FIG. 2 shows interpolation design according to the invention using a network of switches and a considerably reduced number of comparators. The considerable saving is obvious since approximately eighty transistors are used for one comparator compared to 1 transistor for a switch. Here the pickoff points of the voltage divider Sp are connected to switches S1 to S8, which are able to connect the individual pickoff points with the two comparators COMP and COMP-1. In each case two neighboring switches are switched through—in FIG. 2 switches S4 and S5. The voltage of the pickoff point of the voltage divider Sp assigned to switch S4 has switched the operational amplifier COMP. Operational amplifier COMP-1 is then in standby until the voltage at the pickoff point assigned to switch S5 reaches its threshold. In this case, the pair of switches S5/S6 are activated. If, however, the voltage falls below the value assigned to switch S4 and COMP switches off, the pair of switches S3/S4 are activated. Changeover of the switches is performed by block ILOG which is indicated by the busbar SL.

This logic ILOG is an expanded decoder logic which records and outputs the momentary angular position and comprises fewer than 100 gates. This considerably reduces the demand for semiconductors and allows higher interpolation for less chip area.

FIG. 2 also shows a solution using only one comparator COMP, which then requires an additional changeover switch WS 1/2, whereby this is also switched consistently from condition 1 to 2 by the ILOG. If, for example, switch S4 has led to comparator COMP being switched on, the neighboring switch to S4 i.e. S3 or S5 is switched consistently via WS 1/2 to the comparator COMP alternately with the clock pulse rate. The changeover switch is not required when using two comparators COMP and COMP$_{-1}$.

Figure 3:
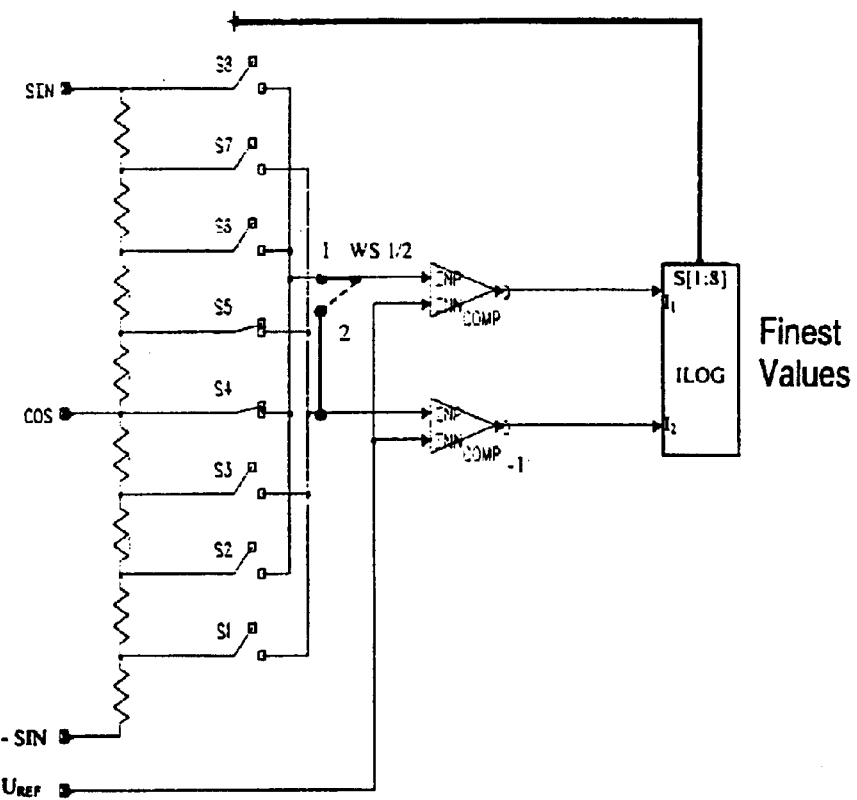
FIG. 3 shows an exemplary embodiment of the interpolation using a network of switches and one or two comparators and three sine vectors.

FIG. 3 uses the principle of interpolation with a network of switches according to FIG. 2 with SIN and COS signals. By supplying or feeding in the 3 vectors from the SIN/COS signals to the resistor network as well as using the $U_{Ref}$ reference the number of resistors and therefore the number of reference points or switches can be reduced by a factor of 2. From measured signals consisting otherwise only of SIN/COS signals a third vector can easily be created by producing a −SIN voltage signal through inverting a +SIN signal shifted by 180°. The same can be done with a +COS to −COS signal. Usually ±SIN- and ±COS signals have been produced as measured signals by for example magneto resistive sensors with a bridge circuit, which allows very simple creation of the three vectors to be used in the inventive interpolation. The three vectors may be formed from e.g. +SIN, −SIN, +COS, or +COS, +SIN, −COS whereby the sequence of vectors depends on their phase position to one another and the desired zero point relationship to the binary signal output.

Hence the interpolator in FIG. 2 has a resolution of 3 bits (8 times) and in FIG. 3 with the same number of reference points (pickoff points, e.g. resistors/switches) a resolution of 4 bits (16 times). As in FIG. 2, the interpolation in FIG. 3 may be performed using one or two comparators, whereby logic ILOG controls switches $S_1$ to $S_8$ or W 1/2 accordingly.

The number of switches S is dependent on the number of resolution steps and for example for a 10-bit binary converter ($2^{10}$) must be guaranteed using 512 ($2^{10-1}$) switches.

Figure 8:
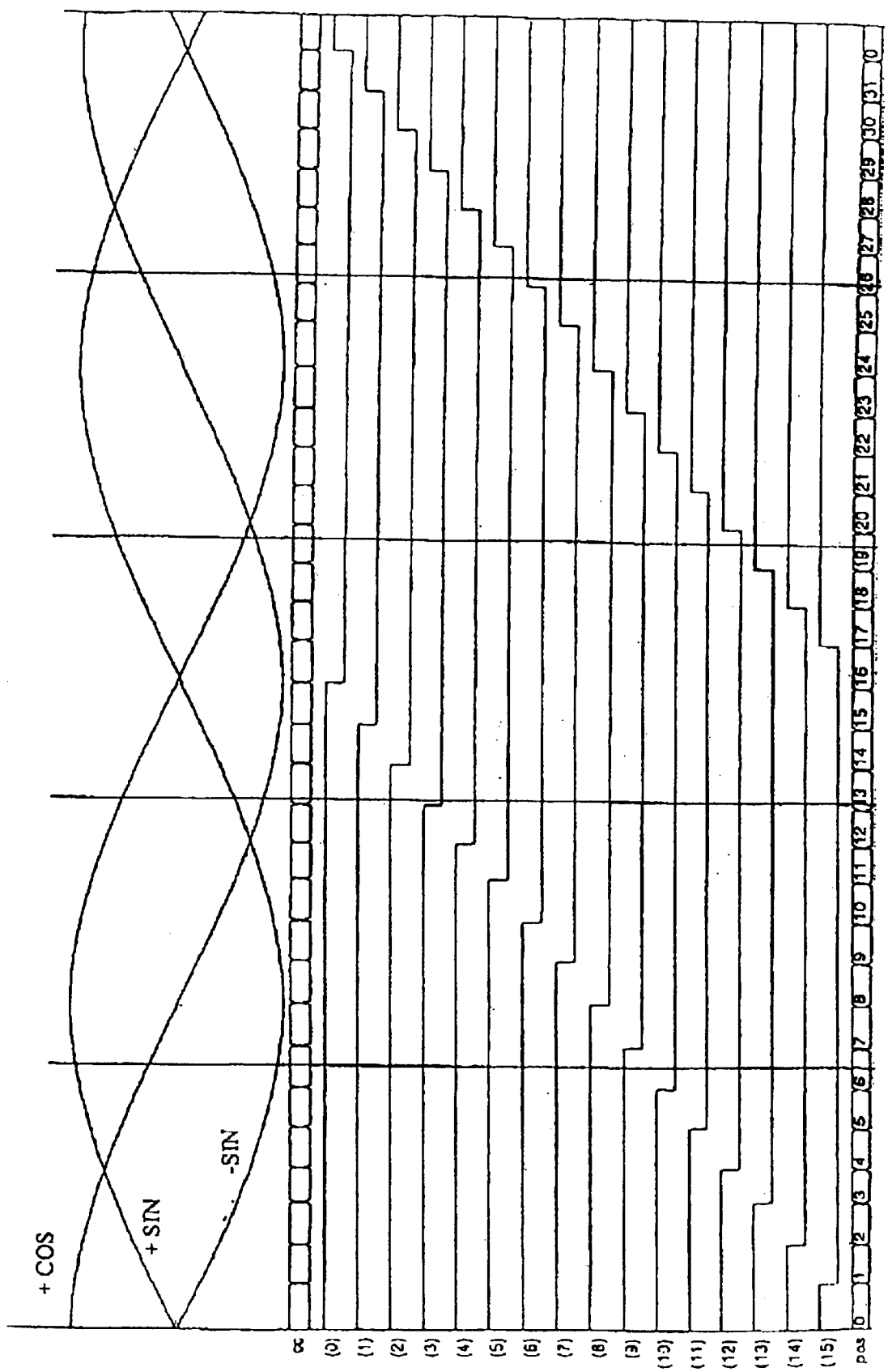
FIG. 8 shows the signal flow in a one stage interpolator for sine signal vectors.

The relevant signal sequence can be seen in the signal flow diagram of FIG. 8 for e.g. 5-bit interpolation. Of particular advantage in this signal processing with vector SIN/COS signals, is that the vector used for evaluation corresponds in voltage modulus to at least the amplitude and up to 1.4 times the amplitude so that it always offers an almost constant high voltage potential for the evaluation. In addition the differential voltages forming the vector eliminate as far as possible any signal noise amplitudes, so that precise measured signals can be used for highly accurate interpolation. A further advantage of the above mentioned interpolation using vectors is direct signal processing to binary data requiring no additional and costly computer processing. It is only necessary to dimension the pickoff points via resistor dividers accordingly and to feed them via switches to direct evaluation as required.

As already mentioned, the principle of single stage interpolation for fine values is limited to around 8-bit resolution and may only be increased by taking expensive steps. A switching device or process is therefore sought, which would allow beneficial interpolation with higher resolutions. A start in overcoming this limitation is by carrying out angle determination according to the invention in two stages.

Figure 4:
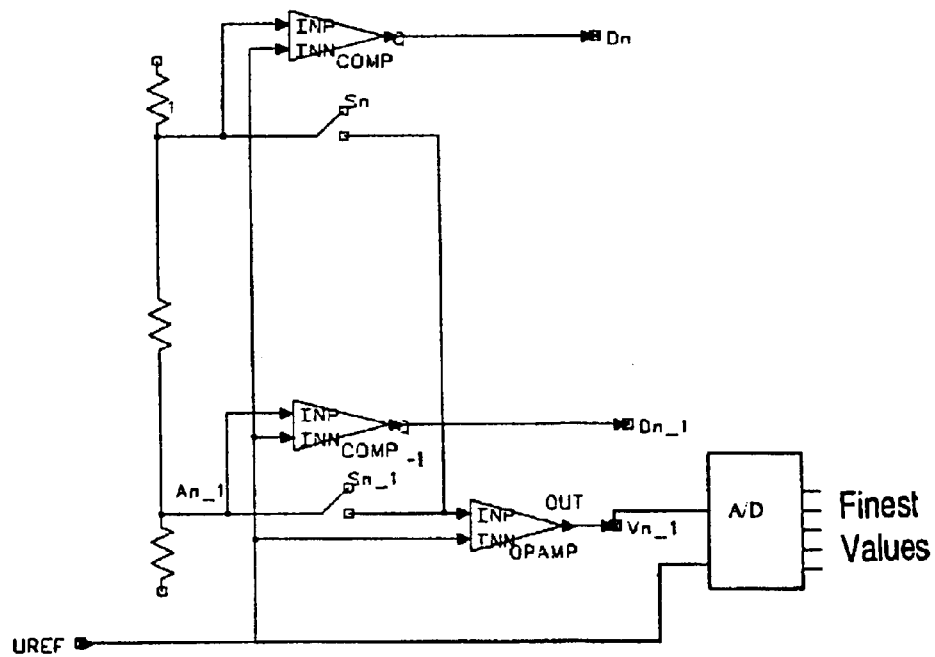
FIG. 4 shows a principle of two stage interpolation with A/D conversion for finest values.

FIG. 4 shows the principle of two stage interpolation using A/D conversion for finest values.

The position of the resistor network to which a comparator has last switched is determined digitally. FIG. 4 basically shows only a part of the voltage divider of FIG. 2 to which both operational amplifiers COMP and COMP-1 are switched in sequence. Here, the comparator which switched last is comparator COMP__1 with output port Dn__1. Signal An_1 lying at the input of this comparator is now switched via a switch Sn_1 to an operational amplifier OPAMP and amplified to the analog signal Vn_1. This signal is now proportional to the difference of the current angle to the angle given by switching of COMP_1. The differential angle can now be digitalized by a suitable A/D converter and be added to the fine value as a finest value correction.

In order to achieve the resolution of this finest value in an appropriate timescale, the A/D conversion must either occur very rapidly in block A/D (1 clock pulse) or semi frozen using a sample and hold circuitry.

When introducing an A/D converter circuitry at this point, care must be taken not to lose at least one of the superb properties of the simplicity or absolute real-time capability of the interpolator. If a relatively simple A/D converter—such as a sigma-delta converter—is used, many clock pulse cycles are required to determine the finest value. For very fast A/D converters the cost of the circuitry for interpolation, even for low resolutions, is very high.

Figure 5:
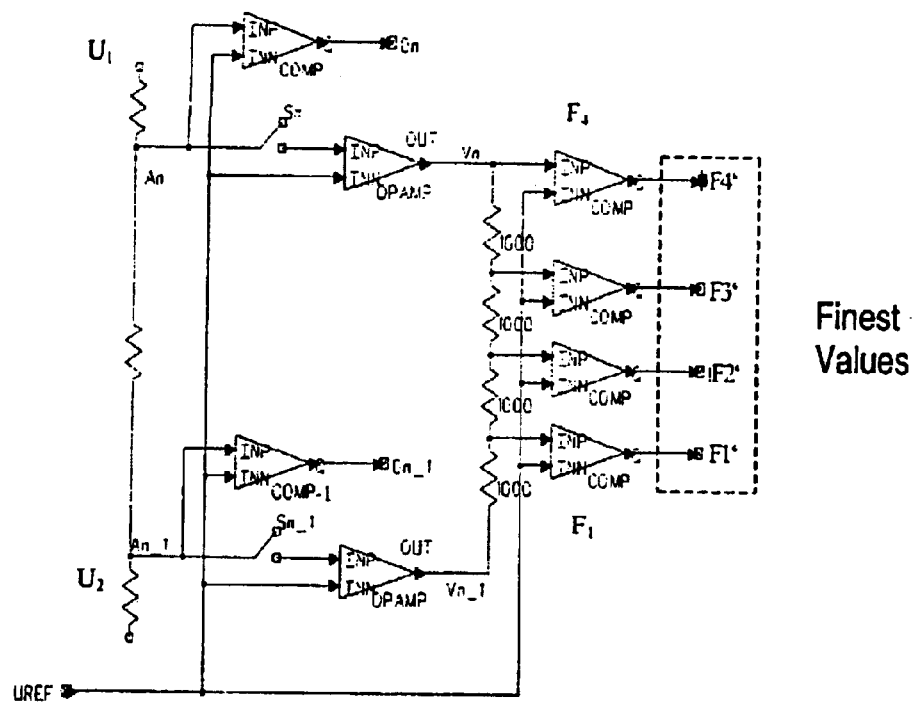
FIG. 5 shows a principle of two stage interpolation using two OPAMP and reference comparators for finest values.

FIG. 5 shows a suitable principle of such a design or a corresponding process. COMP_1 and COMP are the comparators, which show An_1 is smaller and An greater than Uref, i.e. the angle sought is between the two fine values given by the comparators. Both analog values An and An_1 are supplied via switches Sn and Sn_1 to two identical amplifiers OPAMP as well as amplified to signals Vn and Vn_1 and fed once again into a chain of resistors. Here Vn≧Uref>Vn_1. The divided voltage is again compared with Uref using the four comparators F1 to F4 shown as an example and as in the first stage an angle value (in the example 2 bits) between the fine values is determined from the digital starting values F1' to F4'. This A/D conversion within one clock pulse (flash A/D converter) may still be applied for lower resolution using correspondingly few comparators.

In principal it is also possible to design in the second stage a switch solution with one or two comparators similar to FIG. 2 using COMP or COMP_1 and WS 1/2. It is particularly beneficial compared to flash A/D converters, if for example the resolution in this second stage exceeds 2 bits.

Figure 6:
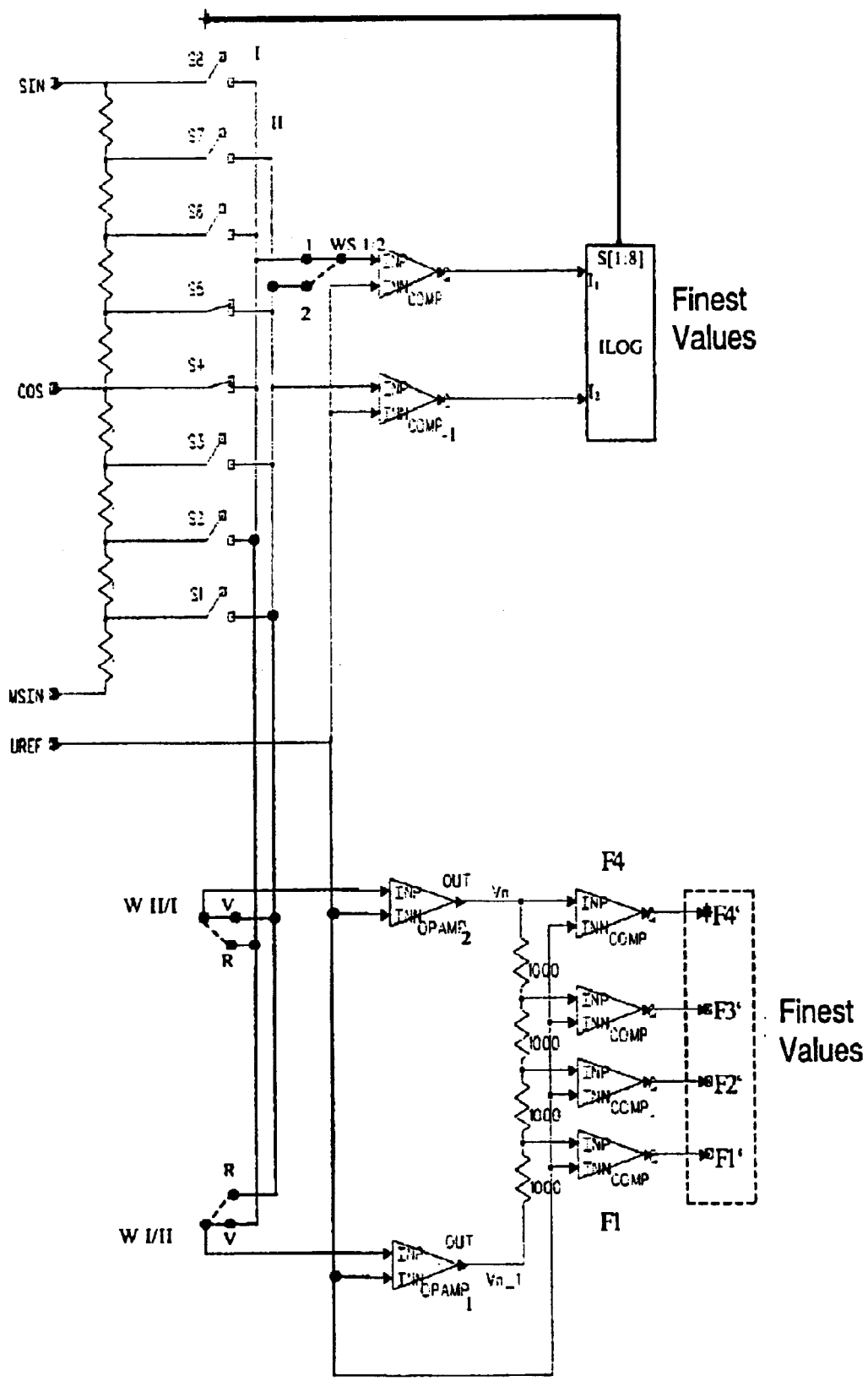
FIG. 6 shows an exemplary embodiment using a network of switches and one or two comparators with three sine signal vectors for the creation of fine values as well as two OPAMP with reference comparators for the creation of finest values.

The circuitry in FIG. 6 shows the principle of a single or two stage interpolator as arranged according to the invention. Using simple integratable circuit components and hence cost effective design it is also possible to achieve full real-time capability, which offer the required functions when used for high resolution and rapid processing of measured signals. Fine values are determined as described in FIG. 3, whereby the logic of ILOG also controls consistent changeover of the changeover contacts W II/I und W I/II to the operational amplifiers OPAMP1 und OPAMP 2. The voltage after the OPAMPs is then led to comparators via resistor dividers, whose signal sequence is used to create finest values.

Not further described is the combination of fine values with finest values which can be done quite logically and which together with the basic absolute value form the total absolute value. It is also possible to achieve via simple logic circuits the appropriate resolution of interpolation for a particular purpose e.g. depending on the speed of the measuring device, using the freely selectable switches S. It is therefore very easy to achieve for example in the simplest case the selection of interpolation stages (single or two stage) according to the speed ranges of the measuring device.

Figure 7:
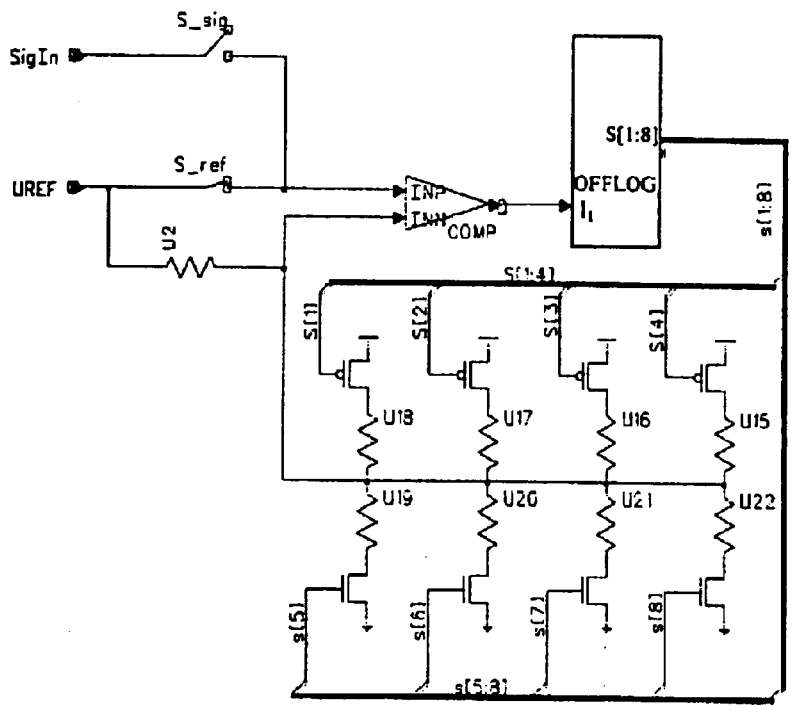
FIG. 7 shows a principle of offset compensation of comparators and operational amplifiers.

FIG. 7 represents the principle of offset compensation in the example of the comparator COMP. At first the INP input of the comparator is separated by the switch $S_{-sig}$ from the signal source Sig $I_n$ and switched through switch $S_{ref}$ over to the reference voltage $U_{ref}$. Switching of the transistors S1 to S8 causes currents to flow through resistors U15 to U22, which produce a correction voltage at resistor U2 and hence at input INN. Resistors U15 to U18 (U19 to U22) stand symbolically for binary stepped current sources according to VDD (VSS). The current sources are stepped such that a compensation voltage can be set taking U2 into account up to a maximum expected offset voltage. The selection of suitable current sources is carried out by logic OFF_LOG, which is activated each time by reset of the chips or periodically. The arrangement shown allows the offset to be easily reduced to $\frac{1}{16}$.

Figure 9:
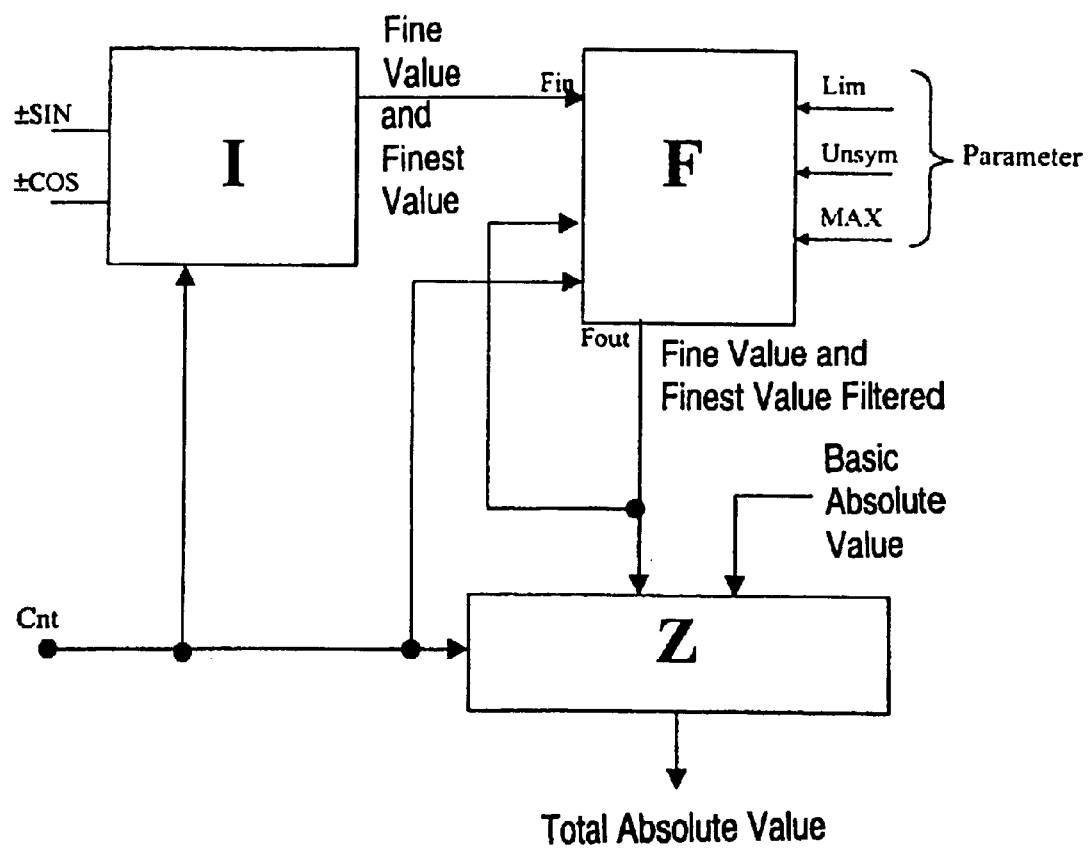
FIG. 9 shows a block diagram of an adaptive digital filter.

In industrial environments and measurement conditions the highly resolved measured signals for fine and finest values are exposed to corresponding levels of interference. Thus voltages delivered by the sensor are superimposed by noise and interference amplitudes which cannot be sufficiently or easily filtered within the working range of measurement up to the highest adjustment speeds. Asymmetrical adaptive digital filtering is used as an example to describe and explain the basic function of further processing of fine and finest values. FIG. 9 shows an advantageous embodiment for recording measured signals rapidly, effectively and with as little interference as possible.

The adaptive digital filter F has as an input the current fine and finest values Fin gained from the interpolator I, which are compared in return to the other filtered fine and finest values Fout, summed according to certain basic filter parameters and used as a comparison against certain limit values for which parameters may be set. When one of the limit values is reached, the filtered measured value output FOUT is consistently increased or reduced by one resolution step. When determining the chosen basic filter parameters according to the direction of movement, this allows simple combination of parameter values Unsym and Lim as appropriate. The basic absolute value and the filtered fine/finest absolute value are combined in block Z.

Figure 10:
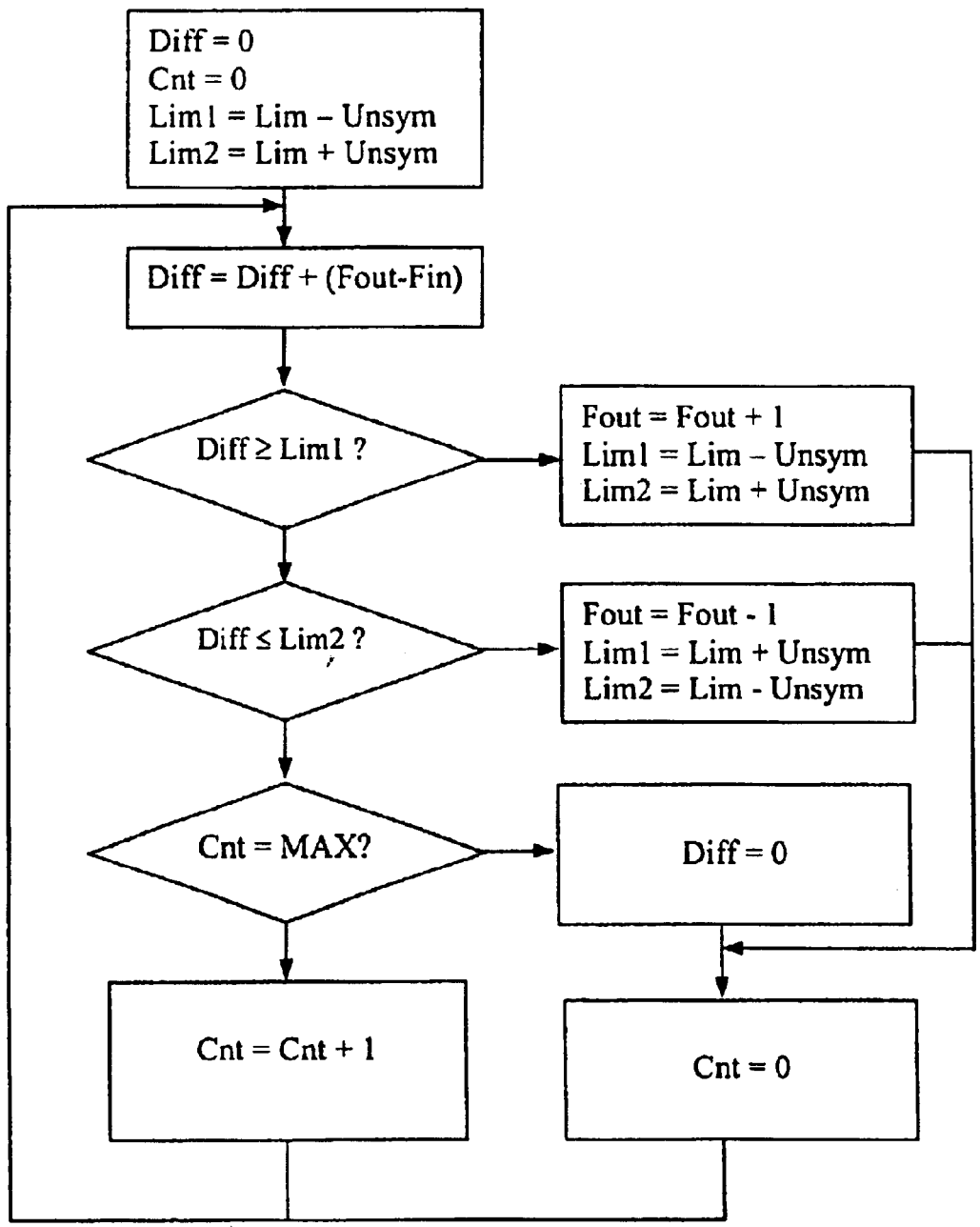
FIG. 10 shows the flow diagram of an adaptive digital filter.

The function of a simple asymmetrical design of the adaptive filter is clearly illustrated in FIG. 10. In the starting condition the difference Diff=0 and Count Cnt=0, i.e. the current measured value Fin is equal to the output measured value Fout. As counting Cnt starts, according to the flow diagram the Diff=Diff+(Fout−Fin) for each pulsed step (e.g. 30 . . . 50 MHz) is first determined and compared to the limits ≧Lim1 and ≦Lim2. When one of the limits is reached, e.g. Lim1 or Lim2, Fout=Fout+1 or Fout=Fout−1 is brought to the measured value output adjusted by one resolution step and evaluation is continued beginning again with Diff=0 and Cnt=0. This creates an effective and correspondingly well filtered measured value output in the total speed range using selectable parameters whereby the measured value output Fout follows the current measured value Fin adaptively. If the current measured value with its periodic deviations constantly moves within set limits, then it is appropriate to start the evaluation process again after a given number MAX of pulsed cycles Cnt. This means that undesirable adaptations of the measured value can be avoided e.g. for minor asymmetries of widely deviating, but symmetrical interference signals which would otherwise interfere with the measured signal. This means that the starting measured signal remains stable even in such limit conditions. The MAX number of pulsed cycles Cnt to be selected depends in the first approximation on the appropriate integration time for observing a measured signal and is therefore also dependant on the chosen filter parameters such as Lim, Unsym. The stronger the filtering and hence the higher the adaptation time constant, the higher the MAX number of pulsed cycles Cnt to be selected.

The inventive design of the adaptive interpolation filter is not limited to the given exemplary embodiments but may be symmetrical, asymmetrical, with fixed or variable parameters and the widest combinations of these. This means the limit values or parameters may be inputted and dependant on e.g. the resolution of the measured signal, the speed of the adjustment device to be measured or also on external conditions of a machine control with special operating points. The limit values for the self adapting measured value output which are flexible and whose parameters may be set in many different ways offers beneficial filtering across the whole range of speed for high resolution interpolation measured value processing in e.g. industrial environments particularly prone to interference.

We claim:

1. An arrangement for interpolating an analog measured signal which is dependent on the measured variable, and which is fed to a voltage divider whose pickoff signals are fed to comparators, from whose output signals the interpolated measured variable is determined, wherein the pickoff signals are fed by means of switches to comparators whose number is smaller than that of the pickoff signals and the switches connect the pickoff signals to comparators for sequential switching of the comparators determining a change point.

2. Arrangement according to claim 1, wherein two comparators are provided for each two neighboring pickoff signals.

3. Arrangement according to claim 2, wherein the two comparators are replaced with one comparator to which both neighboring pickoff signals are fed one after another.

4. Arrangement according to claim 1, wherein the measured signal has a continuous functional course.

5. Arrangement according to claim 4, wherein the measured signal has a linear relationship to the measured variable.

6. Arrangement according to claim 4, wherein the measured signal is formed from the combination of sine functions.

7. Arrangement according to claim 6, wherein three of the signals +sin, −sin, +cos and −cos are used and the range of the combined signal is formed from a varying pair of signals +sin, −sin, +cos and −cos.

8. Arrangement according to claim 1, wherein absolute value determination of absolute values is carried out by sensors and intermediate values between each pair of neighboring absolute values are determined by an incremental measuring system.

9. Arrangement according to claim 8, wherein the determination of absolute values and incremental values to give a total absolute value is carried out at the sensor.

10. Arrangement according to claim 1, further comprising an interpolation stage for amplifying difference values obtained from the first interpolation, and then further interpolating the difference values to finest values.

11. Arrangement according to claim 1, wherein an interpolation filter is added in which the difference of the filtered value to the current measured value is formed in each case and these differences are evaluated and when a limit value is reached the last filtered measured value is increased or reduced by one step.

12. Arrangement according to claim 11, wherein evaluation of the current measured values takes account of the last established direction of movement of the supplied measured values.

13. Arrangement according to claim 1, wherein the speed of the adjustment device is a factor for choosing the resolution of the interpolation and/or filtering of the measured signal.

14. Method for interpolating an analog measured signal which is dependent on the measured variable, and which is fed to a voltage divider whose pickoff signals are fed to comparators, from whose output signals the interpolated measured variable is determined, wherein the pickoff signals are fed by means of switches to comparators whose number is smaller than that of the pickoff signals and the switches connect the pickoff signals consistently to comparators for sequential switching of the comparators, thereby, determining a change point.

15. An arrangement for interpolating an analog measured signal which is dependent on the measured variable, and which is fed to a voltage divider whose pickoff signals are fed to comparators, from whose output signals the interpolated measured variable is determined, wherein the pickoff signals are fed by switches to comparators whose number is smaller than that of the pickoff signals and the switches connect the pickoff signals to comparators, wherein two comparators are provided for each two neighboring pickoff signals.

16. The arrangement according to claim 15, wherein the two comparators are replaced with one comparator to which both neighboring pickoff signals are fed one after another.

17. The arrangement according to claim 15, wherein the measured signal has a continuous functional course.

18. The arrangement according to claim 17, wherein the measured signal has a linear relationship to the measured variable.

19. The arrangement according to claim 17, wherein the measured signal is formed from the combination of sine functions.

20. The arrangement according to claim 19, wherein three of the signals +sin, −sin, +cos and −cos are used and the range of the combined signal is formed from a varying pair of signals +sin, −sin, +cos and −cos.

21. The arrangement according to claim 15, wherein absolute value determination of absolute values is carried out by sensors and intermediate values between each pair of neighboring absolute values are determined by an incremental measuring system.

22. The arrangement according to claim 21, wherein the determination of absolute values and incremental values to give a total absolute value is carried out at the sensor.

23. The arrangement according to claim 15, further comprising an interpolation stage which amplifies difference values obtained from the first interpolation, and then further interpolated to finest values.

24. The arrangement according to claim 15, wherein an interpolation filter is added in which the difference of the filtered value to the current measured value is formed in each case and these differences are evaluated and when a limit value is reached the last filtered measured value is increased or reduced by one step.

25. The arrangement according to claim 24, wherein evaluation of the current measured values takes account of the last established direction of movement of the supplied measured values.

26. The arrangement according to claim 15, wherein the speed of the adjustment device is a factor for choosing the resolution of the interpolation and/or filtering of the measured signal.

* * * * *

UNITED STATES PATENT AND TRADEMARK OFFICE
CERTIFICATE OF CORRECTION

PATENT NO. : 6,741,199 B2
DATED : May 25, 2004
INVENTOR(S) : Peter Gärtner, Harald Richter and Anton Rodi It is certified that error appears in the above-identified patent and that said Letters Patent is hereby corrected as shown below:

Title page,
Item [75], Inventors, should read -- Peter Gärtner, Budapest (HU); Harald Richter, Gärtringen (DE); Anton Rodi, Leimen (DE). --

Signed and Sealed this

Twenty-first Day of December, 2004

JON W. DUDAS
*Director of the United States Patent and Trademark Office*